US 6,741,778 B1

(12) United States Patent
Chan et al.

(10) Patent No.: US 6,741,778 B1
(45) Date of Patent: May 25, 2004

(54) OPTICAL DEVICE WITH CHIP LEVEL PRECISION ALIGNMENT

(75) Inventors: Benson Chan, Vestal, NY (US); Richard R. Hall, Endwell, NY (US); How Tzu Lin, Vestal, NY (US); John H. Sherman, Lisle, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/578,216

(22) Filed: May 23, 2000

(51) Int. Cl.[7] .................................................. G02B 6/26
(52) U.S. Cl. ............................ 385/52; 385/88; 385/92; 385/94
(58) Field of Search ........................ 385/52, 88, 92, 385/39–47, 80, 85, 94, 89

(56) References Cited

U.S. PATENT DOCUMENTS

| | | | |
|---|---|---|---|
| 5,179,609 A | 1/1993 | Blonder et al. | 385/89 |
| 5,247,597 A | 9/1993 | Blacha et al. | 385/88 |
| 5,337,398 A | 8/1994 | Benzoni et al. | 385/90 |
| 5,420,954 A | 5/1995 | Swirhun et al. | 385/92 |
| 5,499,312 A | 3/1996 | Hahn et al. | 385/91 |
| 5,535,296 A | 7/1996 | Uchida | 385/89 |
| 5,631,988 A | 5/1997 | Swirhun et al. | 385/89 |
| 5,661,831 A | 8/1997 | Sasaki et al. | 385/49 |
| 5,675,889 A | 10/1997 | Acocella et al. | 29/830 |
| 5,687,267 A | 11/1997 | Uchida | 385/89 |
| 5,692,083 A * | 11/1997 | Bennett | 385/88 |
| 5,790,730 A | 8/1998 | Kravitz et al. | 385/14 |
| 5,812,717 A * | 9/1998 | Gilliland | 385/88 |
| 5,818,107 A | 10/1998 | Pierson et al. | 257/723 |
| 5,857,049 A | 1/1999 | Beranek et al. | 385/91 |
| 6,282,352 B1 * | 8/2001 | Kato et al. | 385/92 |

* cited by examiner

Primary Examiner—Georgia Epps
Assistant Examiner—M. Hasan
(74) Attorney, Agent, or Firm—Salzman & Levy; Lawrence R. Fraley (57) ABSTRACT

Optical packages and a method of fabricating same, wherein an active optical device can be located relative to a substrate and coupler. The structure includes a substrate having electrical contact pads and alignment pads with precision aligned through-holes for at least one optical fiber. The optical fibers are supported by a housing, or coupler, having alignment pins that are precision located relative to the through-holes in the substrate and the optical fiber. A die, or active optical device, with one or more active optical elements on a first die surface and electrical contacts on a second die surface, is aligned with the electrical pads of the substrate and the active optical elements. The method incorporates the steps of grinding alignment pins into metallic pads and grinding optical fibers in one pass and then aligning the active optical device and the optical fibers by using the surface tension of conductive adhesive liquid. The fibers are then bonded.

17 Claims, 8 Drawing Sheets

OPTICAL DEVICE WITH CHIP LEVEL PRECISION ALIGNMENT

FIELD OF THE INVENTION

The present invention relates to active optical devices and, more particularly, to an optical chip device that can be connected on its back side and edges to provide new and unusual, high precision, chip level, interconnect configurations.

BACKGROUND OF THE INVENTION

Active optical devices, such as VCSELS, edge emitting chips, receiver chips, transmitter chips, etc., having active optical elements, such as lasers, light emitting diodes, light receiving diodes and photo transistors, are usually mounted and connected on a single side to a substrate. They are commonly mounted with a two-dimensional orientation. Only a small vertical component is generally present, using several attachment methods including flex circuit, wire bond and so-called C4 technologies.

Conventional chip-to-optical device attachment techniques are often labor-intensive and prone to inaccuracies. This is due in large part to the extremely small dimensions of the components and their interfaces, as well as to the number of manufacturing and assembly steps required to interconnect those components.

The present invention reflects new optical chip interconnect configurations, wherein all six faces of the chip can be used to interconnect the back side and edges of the optical chip, using standard semiconductor optical lithography and metallization processes and a new, simplified assembly technique.

DISCUSSION OF RELATED ART

In U.S. Pat. No. 5,857,049, issued on Jan. 5, 1999, to Beranek et al, for PRECISION ALIGNMENT OF OPTO-ELECTRONIC DEVICES, an optoelectronic module is shown that is precisely aligned with an optical fiber. The module is solder connected to the optical fiber supported upon a base, and surface tension of molten solder is used to self-align the connection of the components.

In U.S. Pat. No. 5,818,107, issued to Pierson et al, on Oct. 6, 1998, for CHIP STACKING BY EDGE METALLIZATION, an integrated circuit package is illustrated, wherein increased mechanical and electrical reliability are achieved by integrated circuit chips formed into a chip stack, and bonded onto a substrate. The thickness of a metallization feature and the bonding material provide a stand-off between chips that allows improved heat dissipation.

In U.S. Pat. No. 5,790,730, issued to Kravitz et al, on Aug. 4, 1998, for PACKAGE FOR INTEGRATED OPTIC CIRCUIT AND METHOD, a structure and method are shown for packaging an integrated optic circuit having multiple microlenses. Surface grating forms channels between the optical circuit and the microlenses. Alignment for registration patterns is achieved using surface tension of molten solder in a plurality of solder bump bonds.

In U.S. Pat. No. 5,687,267, issued to Uchida on Nov. 11, 1997, for INTEGRATED OPTOELECTRONIC COUPLING AND CONNECTOR, an optoelectronic module is optically aligned with optical fibers on a common substrate having V-shaped alignment grooves.

In U.S. Pat. No. 5,675,889, issued on Oct. 14, 1997, to Acocella et al, for SOLDER BALL CONNECTIONS AND ASSEMBLY PROCESS, two substrates are aligned and connected using the surface tension of molten solder.

In U.S. Pat. No. 5,661,831, issued to Sasaki et al, on Aug. 26, 1997, for OPTICAL MODULE HAVING SELF-ALIGNED OPTICAL ELEMENT AND OPTICAL WAVEGUIDE BY MEANS OF BUMPS ON RECTANGULAR PADS AND METHOD OF ASSEMBLING THEREOF, an optical module is shown mounted, with a wave guide and a laser diode, upon a silicon substrate. Surface tension of molten solder is used to self-align the laser diode array to a patterned pad on the silicon substrate.

In U.S. Pat. No. 5,631,988, issued on May 20, 1997, to Swirhun et al, for PARALLEL OPTICAL INTERCONNECT, optical fibers are interconnected to an array of optical devices, and aligned by surface tension of melted solder joining the two elements. Alignment holes are laser drilled in a substrate. Pads are formed through lithography relative to the holes. Then flip-chip technology is used to align the chip to the pads laterally.

In U.S. Pat. No. 5,337,398, issued to Benzoni et al, on Aug. 9, 1994, for SINGLE IN-LINE OPTICAL PACKAGE, an optical packaging arrangement is shown. Solder bump alignment is used to align the active device, the lens, and the lens holder. A fiber ferrule is placed over the assembled components with a modicum of precision.

In U.S. Pat. No. 5,535,296, issued on Jul. 9, 1996, to Uchida, for INTEGRATED OPTOELECTRONIC COUPLING AND CONNECTOR, an integrated mounting assembly is illustrated, wherein optical fibers are supported between a grooved substrate and a clamping substrate. The optical fibers are coupled to a device. Alignment is achieved by surface tension of melted solder.

In U.S. Pat. No. 5,499,312, issued to Hahn et al, on Mar. 12, 1996, for PASSIVE ALIGNMENT AND PACKAGING OF OPTOELECTRONIC COMPONENTS TO OPTICAL WAVEGUIDES USING FLIP-CHIP BONDING TECHNOLOGY, a method and apparatus are shown for automatic alignment of optical waveguides to photonic devices. Wettable pads are used and surface tension helps align the elements.

In U.S. Pat. No. 5,420,954, issued on May 30, 1995, to Swirhun et al, for PARALLEL OPTICAL INTERCONNECT, optical fibers are interconnected to an array of optical devices, and aligned by surface tension of melted solder joining the two elements.

In U.S. Pat. No. 5,247,597, issued to Blacha et al, on Sep. 21, 1993, for OPTICAL FIBER ALIGNMENT, an optical fiber is aligned with an emitting or receiving surface, using surface tension of solder bonds.

In U.S. Pat. No. 5,197,609, issued on Jan. 12, 1993, to Blonder et al, for OPTICAL ASSEMBLY INCLUDING FIBER ATTACHMENT, surface tension of liquified materials is used to face-align fibers disposed in a groove, with an optical device.

SUMMARY OF THE INVENTION

In accordance with the present invention, there are provided an optical packaging structure and method for producing same. The structure comprises a substrate having electrical contact pads and alignment pads with precision aligned through-holes for at least one optical fiber. The optical fiber(s) are supported by a housing, or coupler, having alignment pins that are precision located relative to the through-holes in the substrate and the optical fiber. A die, having at least one active optical element on a first die surface and electrical contacts on a second die surface, is aligned with the electrical pads of the substrate and the active optical element(s). The electrical contact pads are conductively bonded to the electrical contacts on the second die surface. The alignment pins are bonded to the precision aligned through-holes in the substrate.

The method incorporates the steps of grinding pins and optical fiber(s) in one pass and then aligning the active optical device and the optical fibers by surface tension of solder or other conductive adhesive liquid. The substrate comprises copper circuit contacts and doughnut shaped alignment pads that are used as an etch mask to allow removal (hole formation) of substrate material in a central region of the alignment pad. This precision aligned hole, which aligns with the electrical contacts of the substrate, is used to align the optical fibers in the housing, using pins. Solder balls connect the die to the substrate and the adhesive; or solder on the doughnut pads fix the optical fibers to the substrate.

It is an object of this invention to provide an optical chip device that can be connected on its back side and edges to provide new and unusual, high precision, chip level, interconnect configurations.

It is another object of the invention to provide an optical chip package for coupling a fiber optic cable to a transmitting die.

BRIEF DESCRIPTION OF THE DRAWINGS

A complete understanding of the present invention may be obtained by reference to the accompanying drawings, when considered in conjunction with the subsequent detailed description, in which.

For purposes of clarity and brevity, like elements and components will bear the same numbering and designations throughout the figures.

DESCRIPTION OF THE PREFERRED EMBODIMENT

Generally speaking, the invention features optical packages and a method of fabricating same, wherein an optical chip can be located upon its back side and edge, when bonding it to a substrate, in order to produce new, three dimensional interconnect configurations. The three dimensionality is achieved by using standard semiconductor optical lithography and metallization processes.

Figure 1:
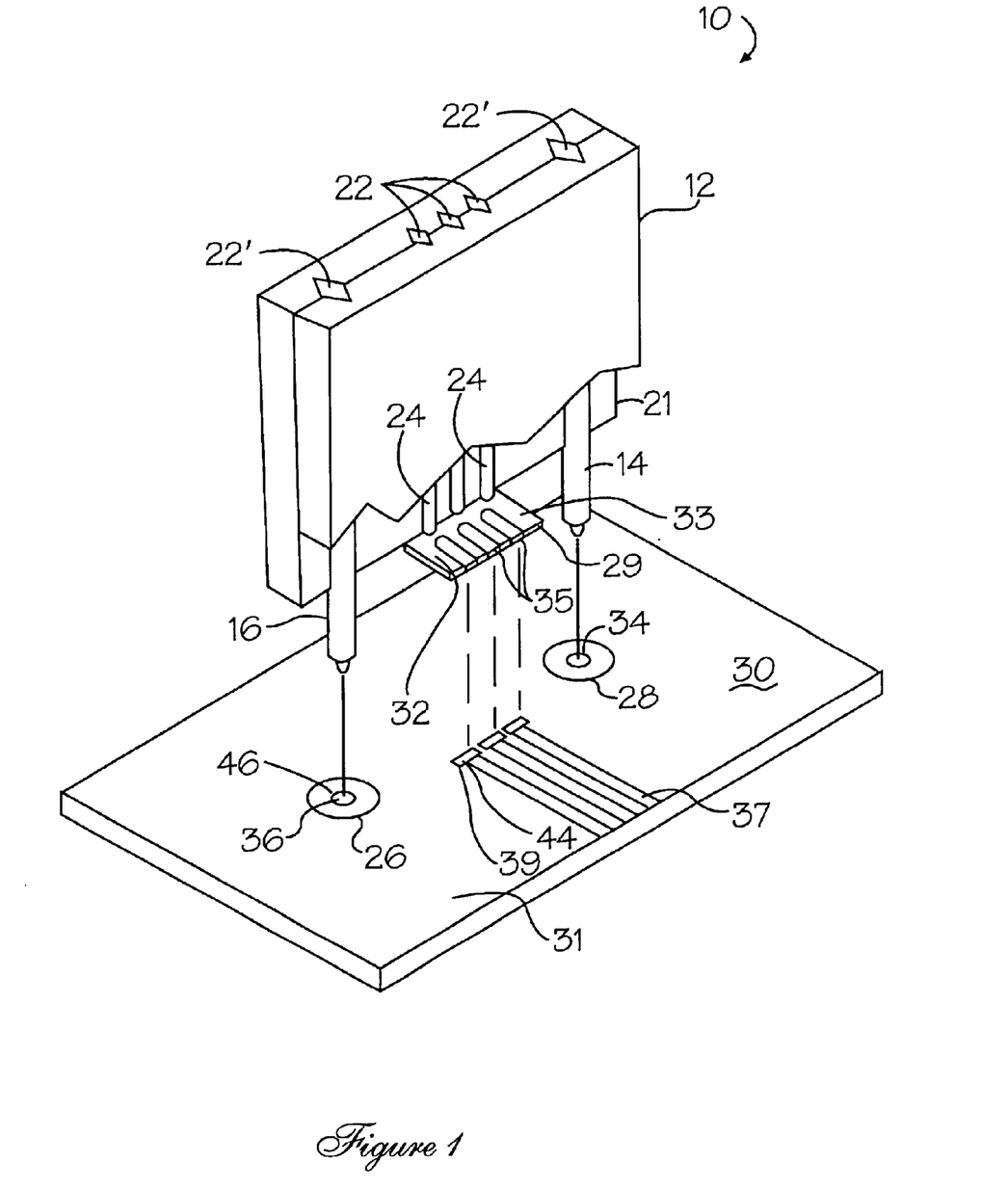
FIG. 1 illustrates a schematic, perspective, exploded view of a first embodiment of the optical package structure of this invention.

Now referring to FIG. 1 an exploded view of a first optical package 10 of this invention is shown. The assembly of this optical package 10 is shown in the sequential fabrication steps depicted in FIG. 6a. A coupler, or housing 12, is shown with respective alignment and locating pins 14 and 16, respectively. The pins 14 and 16 can be any material, such as metal or composite, to enhance or inhibit heat and/or electrical conduction, depending upon the intended application of the optical package.

Figure 6A:
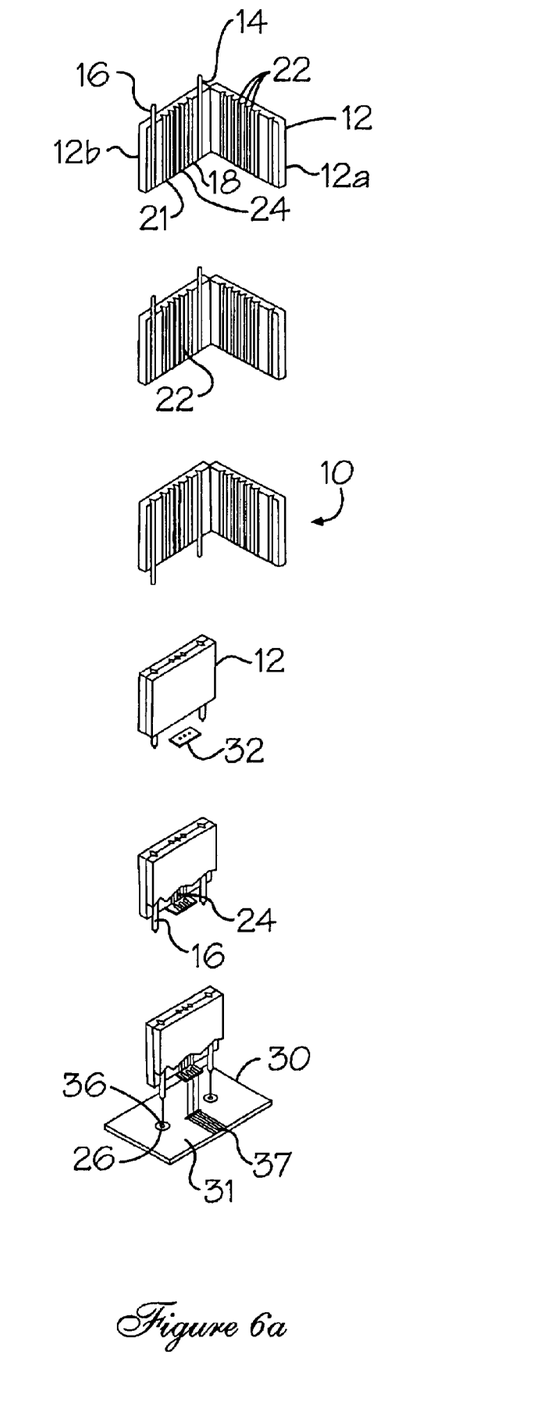
FIG. 6a depicts a perspective, sequential assembly view for the optical package structure shown in FIG. 1.
Figure 6B:
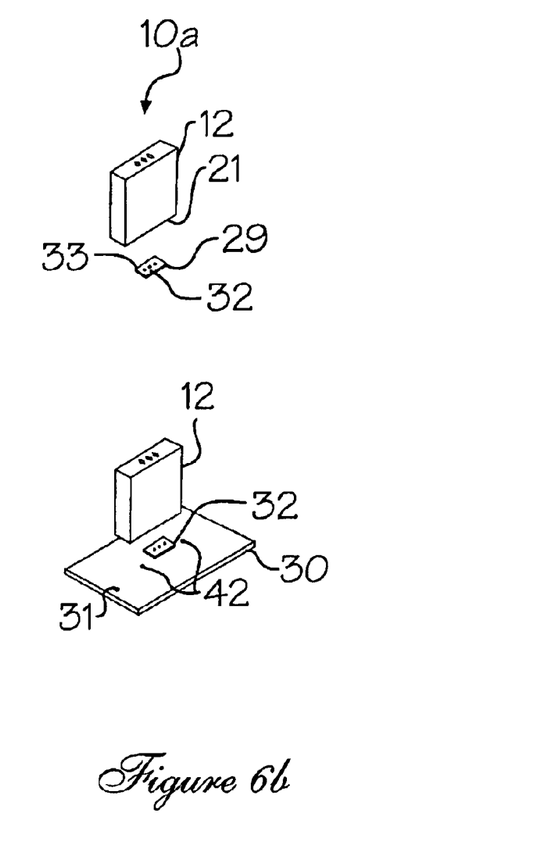
FIG. 6b illustrates a perspective, sequential assembly view for the optical package structure depicted in FIG. 2.

The coupler 12 comprises two half sections 12a and 12b, as shown in FIG. 6a. The two half sections 12a and 12b are joined together to capture alignment pins 14 and 16 in precision V-grooves 22', and to capture optical fibers 24 in V-grooves 22. The alignment pins 14 and 16 align the coupler 12 to the substrate 30.

The optical fibers 24 are ground down, so that they are essentially flush with bottom edge 21 of the housing 12. Doughnut pads 26 and 28 located upon the top substrate surface 31 comprise alignment holes 34 and 36, which respectively receive alignment pins 14 and 16. The holes 34 and 36 of doughnut pads 26 and 28 are precision etched into the substrate 30. The doughnut pads 26 and 28 act as a locating surface for solder or as an adhesive bonding agent 46 that bonds the coupler pins 14 and 16 to the substrate 30. It should be understood that the holes 34 and 36 can be formed not only by etching, but also by drilling, laser ablation, or any other technique known in the art. The surface tension of the solder, when molten, self-aligns the active optical device 32 to the substrate 30.

The active optical device (e.g., light emitting or light receiving element integrated optoelectronic circuit chip) 32 has an upper surface 33, upon which are located active optical elements 35. These active optical elements 35 align with the optic fibers 24 and the circuit lines 37 disposed on surface 31 of the substrate 30. The active optical elements 35 connect to the circuit lines 37 by means of electrical contact pads 39 that are bonded to surface 31 of the substrate 30 by a bonding agent 44.

Figure 2:
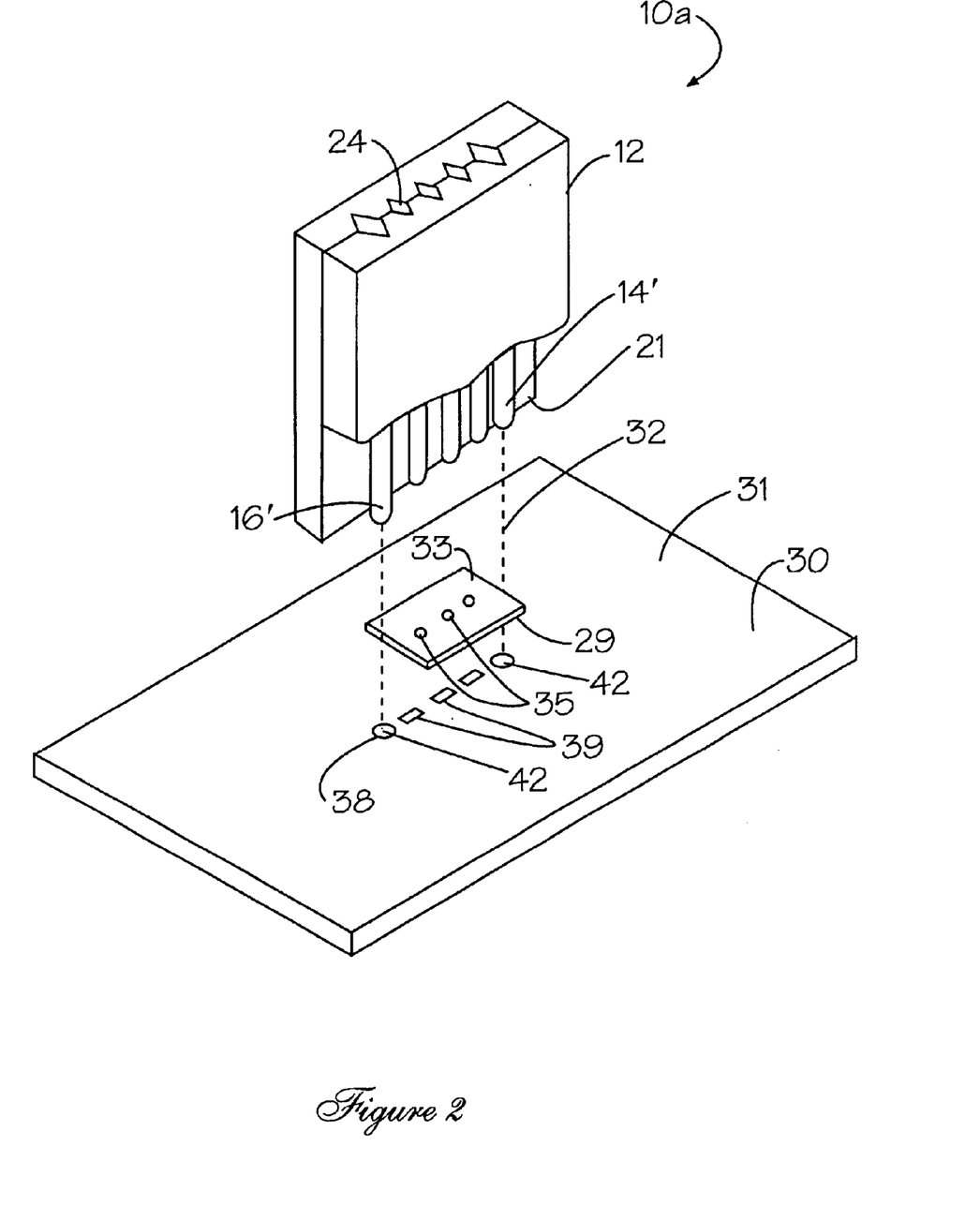
FIG. 2 depicts a schematic, perspective, exploded view of a second embodiment of the optical package structure shown in FIG. 1.

Now referring to FIG. 2, a second embodiment 10a of the optical package 10 of FIG. 1 is illustrated. The sequential fabrication of optical package 10a is depicted in FIG. 6. The alignment of the coupler 12 with the substrate 30 is accomplished without the alignment pins 14 and 16, as shown in FIGS. 1 and 6a. Instead of pins 14 and 16, constructed pads 14' and 16' are used to align the coupler to the substrate alignment pads 42 and the active optical device 32. Constructed pads 14' and 16' may be formed by various means such as grinding pins 14 and 16 down flush to coupler surface 21. Another means of forming constructed pads would be to insert pins 14 and 16 into coupler 12 so that the ends protrude slightly out from the coupler bottom surface 21. A fixture can be used to precisely set the proper pin protrusion to create a constructed pad. Alternatively, constructed pads may be made which protrude out from the surface of the bottom surface 21, by a two step grinding process. First, all the fibers are selectively ground flush with the coupler bottom surface, then, pins 14 and 16 are selectively ground to the desired constructed pad protrusion height. Constructed pads 14' and 16' may also be created by inserting a pin, not shown, into coupler 12 so that the end of it is flush with coupler bottom surface 21. It is preferred to have the coupler fibers and constructed pads ground at the same time to ensure planarity and positional relationship between the constructed pads and fibers. The substrate pads 42 are attached to the constructed pads 14' and 16', respectively, via a bonding agent 38. The bonding agent 38 can be molten solder or liquid adhesive. It is also possible to provide another liquid that can be dissolved and removed at a later time. As before, the surface tension of the molten solder self-aligns the components.

It should be observed that the active optical elements 35 are aligned to the coupler optical fibers 24 via surface tension created between the bonding agent 38, coupler constructed pads 14' and 16', and alignment pads 42 on active optical device 32.

Figure 3:
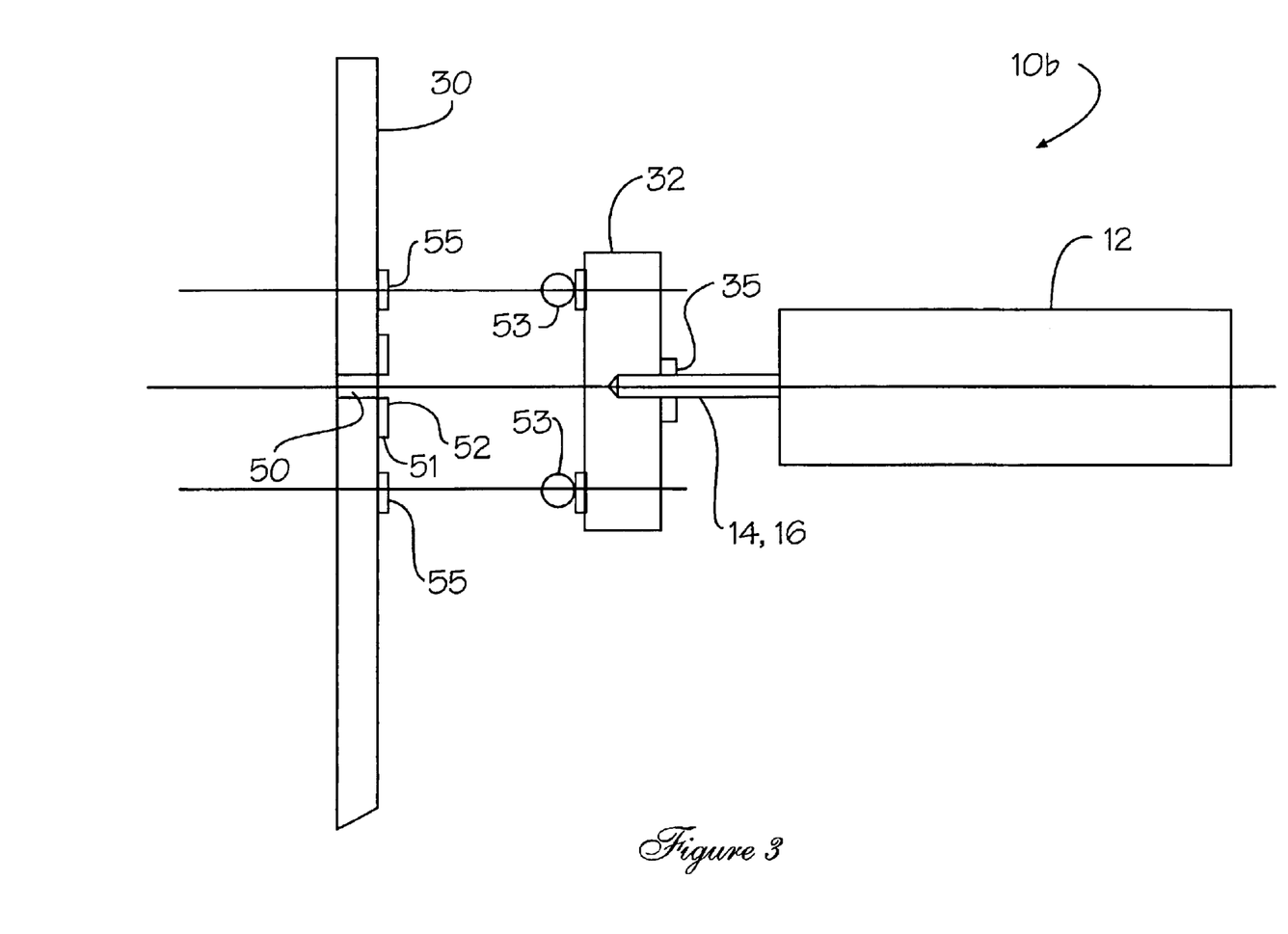
FIG. 3 shows a schematic, side, exploded view of a third embodiment of the optical package structure shown in FIGS. 1 and 2.

Referring to FIG. 3, a third embodiment 10b of the optical package shown in FIG. 1 is illustrated. The optical package 10b comprises a coupler 12 that is aligned with both an active optical device 32 and a flex circuit substrate 30 via the alignment pins 14 and 16. The flex circuit substrate 30 comprises precision locator holes 50 for the alignment pins 14 and 16. The locator holes 50 are precisely disposed for receiving pins 14 and 16 by fabricating the doughnut pads 52, which allow precision etching of the holes and placement of bonding agent 51.

The melted solder balls 53 align with the pads 55, via surface tension, to bring the active optical device 32, the coupler 12, and the substrate 30 into alignment. The pins 14 and 16 are precision located with respect to the optical fibers 24 located in the V-grooves 22 (FIG. 1). This allows the glass fibers 24 to be aligned with the active optical elements 35 disposed on the active optical device Referring now to FIGS. 4a–4d, there are shown four, cross-sectional views of optical coupler housings 12 disposed relative to substrates 30 and active optical devices 32. The various methods and structures of the present invention can best be understood with reference to these FIGURES, sequentially, as hereinbelow described.

The method for manufacturing the optical package 10 includes the steps of providing an optical coupler housing 12 comprising at least two alignment pins 14 and 16 and a plurality of optical fibers 24 extending in a predetermined direction therefrom. The alignment pins 14 and 16 are used to align the optical coupler housing 12 in a horizontal direction, relative to the substrate 30. The alignment pins 14 and 16 and the plurality of optical fibers 24 are ground in one pass, to produce a flush pin face of the optical coupler housing 12 and an electrical pad. The optical coupler housing 12 is aligned to the substrate 30. The integrated optoelectronic circuit 32 is attached to the substrate 30. Finally, the integrated optoelectronic circuit 32 is directly attached to the electrical pad of the optical coupler housing 12.

Figure 4A:
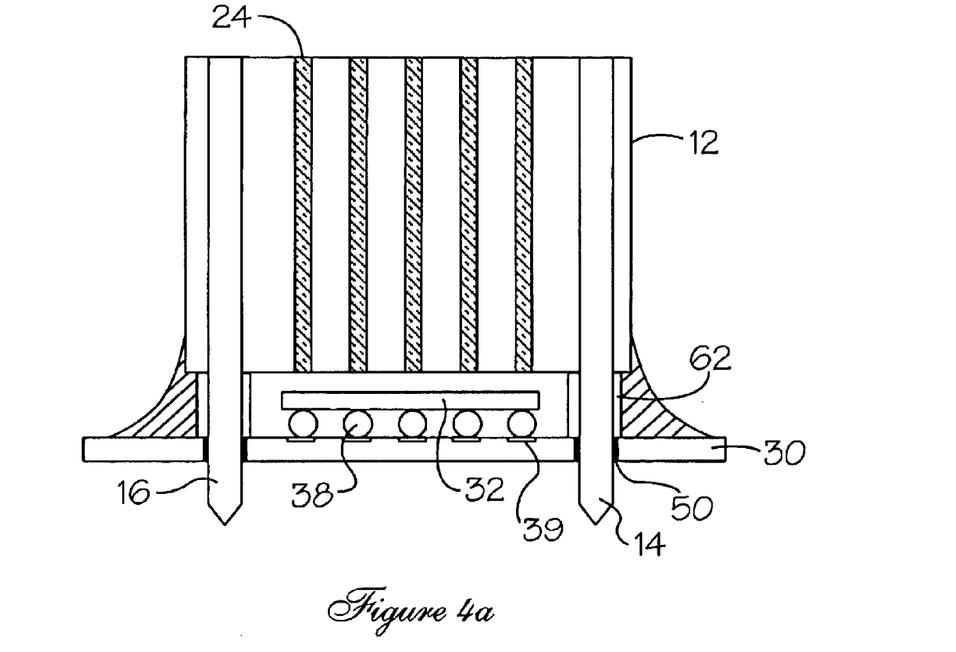
FIGS. 4a–4d illustrate schematic, cross-sectional views of four techniques for aligning and attaching an optical coupler to a substrate and to an integrated circuit chip, all in accordance with the method of the present invention.
Figure 4B:
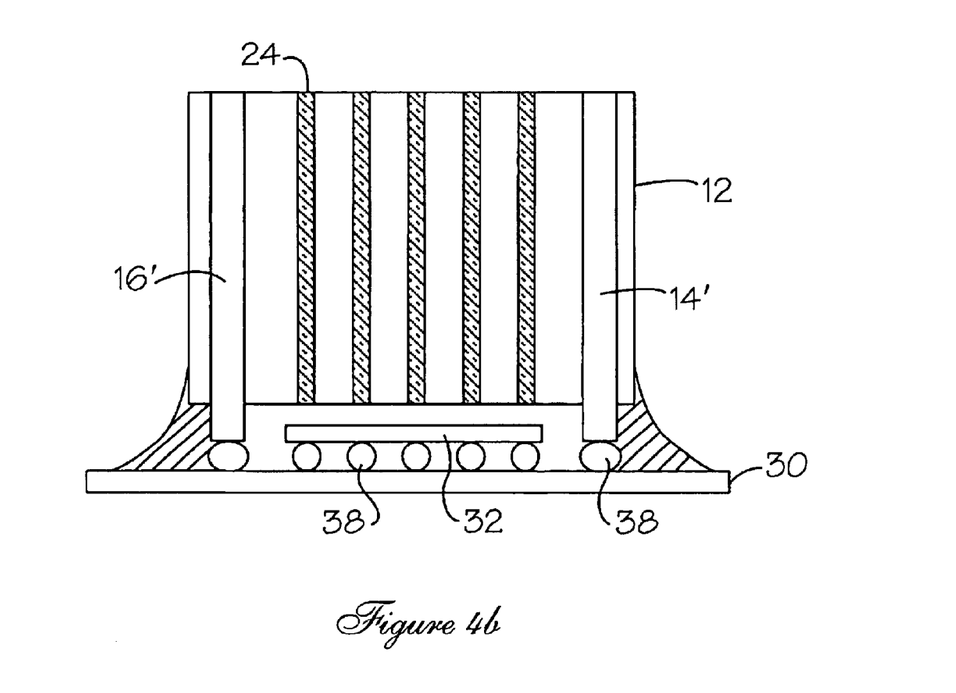

With respect to FIG. 4a, the optical coupler 12 comprises both optical fibers 24 and alignment pins 14 and 16, which are accurately positioned relative to each other in an optical lithographic process that forms no part of the present invention. The locator holes 50 in the substrate 30 for the alignment pins 14 and 16, as well as the location of electrical contact pads 39, are also accurately positioned relative to each other by optical lithography. The optical coupler 12 is thus attached to the substrate 30 by means of alignment pins 14 and 16. The active optical device 32 is attached to the substrate 30 by means of the C4 connections 38. Note that the active optical device 32, itself, is not connected to the optical coupler housing 12 in this embodiment, but is aligned therewith by means of its connection to the substrate 30. It is the mating of the optical coupler 12 to the substrate 30 and the substrate 30 to the device 32 that aligns the optical fibers 24 to the active optical device 32 in the optical package 10. Standoffs 62 in conjunction with alignment pins 14 and 15 establish a predefined offset distance between the top of the active optical device 32 and the coupler surface 12.

With respect to FIG. 4b, once again, the optical coupler 12 comprises both optical fibers 24 and constructed pads 14' and 16', which are accurately positioned relative to each other via an optical lithographic process. The optical coupler 12 is attached to the substrate 30 by means of constructed pads 14' and 16' that are not inserted into the substrate 30 in this case, but rather are attached thereto by means of C4 solder ball connections 38. The active optical device 32 is also attached to the substrate 30 by means of the C4 connections 38. The active optical device 32, itself, is aligned with the optical fibers 24 in the optical coupler 12 by solder ball reflow of the coupler/substrate sub-assembly and the chip/substrate sub-assembly.

Figure 4C:
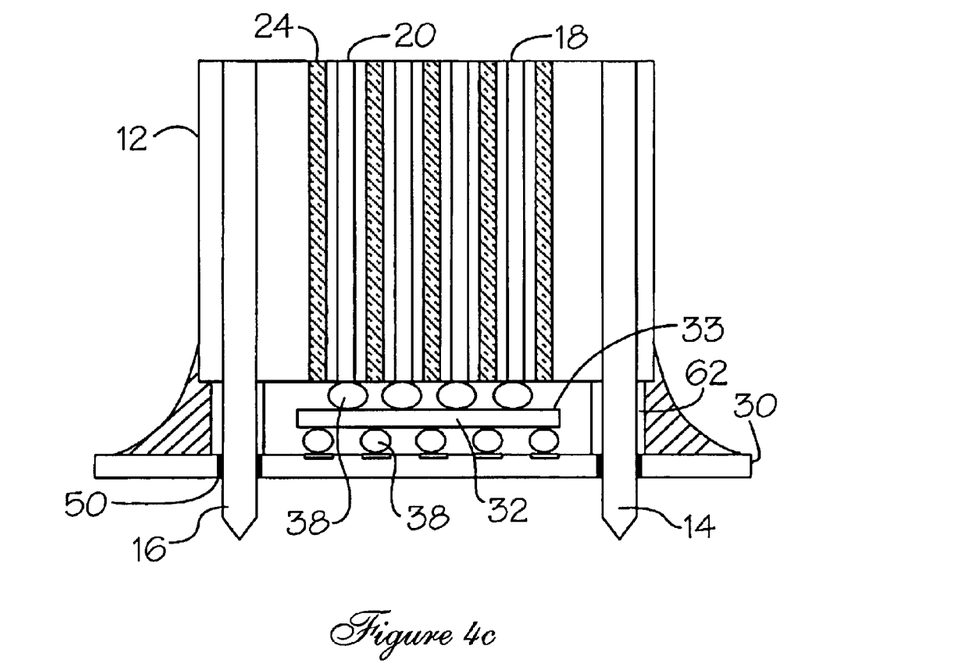
Figure 4D:
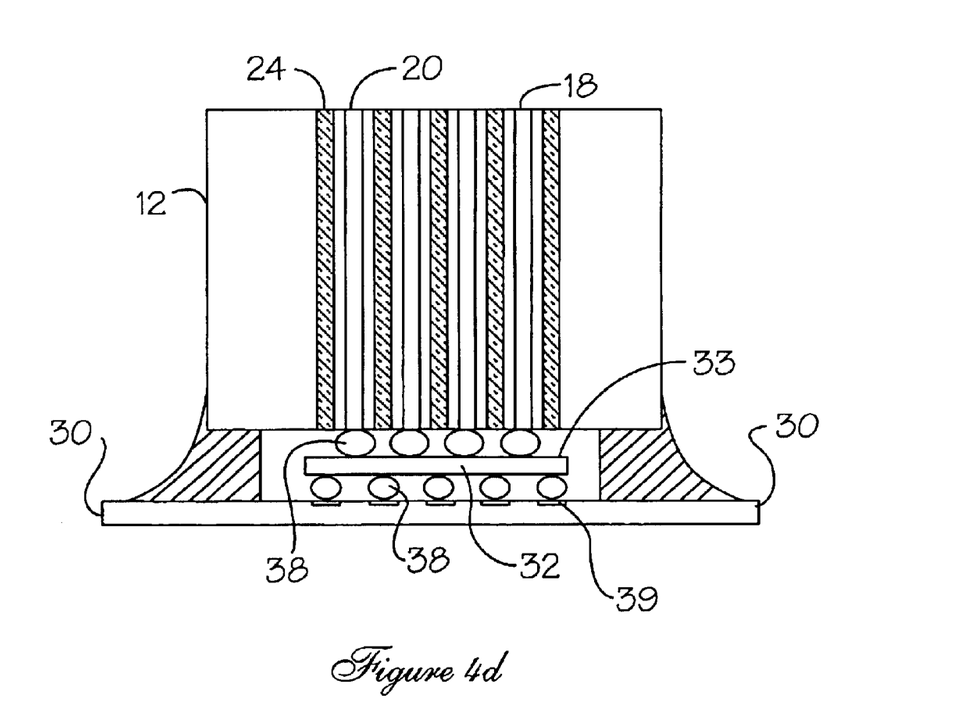

With respect to FIGS. 4c and 4d, the optical coupler 12 comprises constructed pads 18 and 20 interleaved with optical fibers 24. The optical fibers 24 and precision constructed pads 18 and 20 are accurately positioned relative to each other by optical lithographic means. The end of the optical coupler 12 is polished concurrently with the optical fibers 24 and the constructed pads 18 and 20. Alignment pins 14 and 16 (FIG. 4c), in this case, are optional and not shown in FIG. 4d, as the constructed pads 18 and 20 can also provide structural support, as well as locating and aligning functions.

A bonding agent 38, such as reflowed C4 solder ball joints, is introduced between the electrical pads of the optical coupler 12 and the upper surface 33 of the active optical device 32. By placing the C4 connections at the end faces of the constructed pads 18 and 20, alignment between the active optical device 32 and the optical coupler 12 is facilitated. Also connecting the active optical device 32 to electrical contact pads 39 on the substrate 30 are C4 connections 38, as shown, which establishes the final structure of electrical connections between the active optical device 32 and the substrate 30.

Figure 5A:
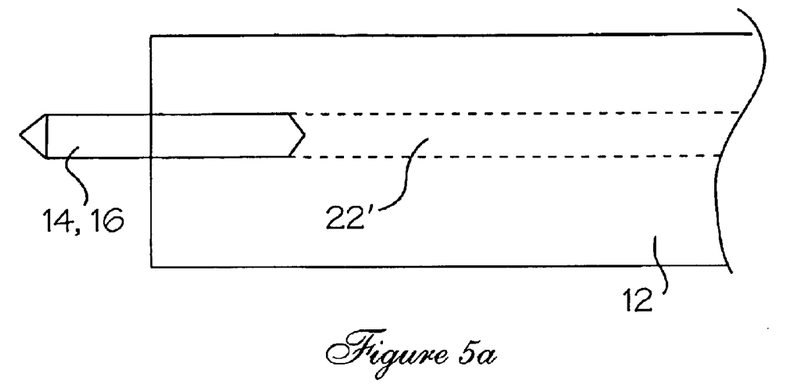
FIG. 5a depicts a schematic, side view of the coupler of FIG. 3 with a locating pin inserted therein.

Referring to FIG. 5a, a coupler 12 is shown with precision V-groove 22' (typical) for locating the optical fibers 24 and locating pins 14 and 16.

Figure 5B:
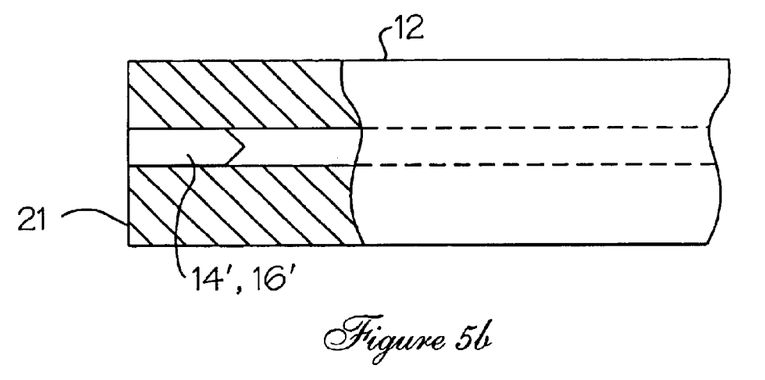
FIG. 5b illustrates a schematic, side view of the coupler of FIG. 5a with the locating pin cut and polished.

Referring to FIG. 5b, the constructed pads 18 and 20 are illustrated after they have been ground flush concurrently with the bottom surface 21 of the coupler housing 12. The same holds true for locating pins 14' and 16'.

Figure 5C:
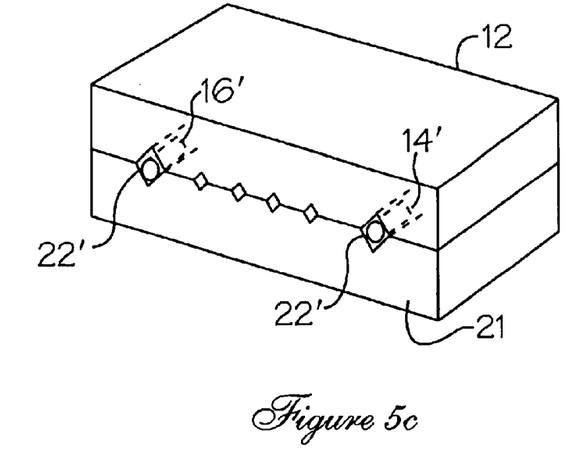
FIG. 5c shows a schematic, perspective view of the coupler depicted in FIG. 5b with flush pins located in V-groove holes.

Referring to FIG. 5c, the coupler 12 is shown with both pins 14' and 16' having been ground down. After grinding and polishing the pins flush, the pins can then be soldered to a pad on-the substrate 30 (not shown in this view).

Figure 6C:
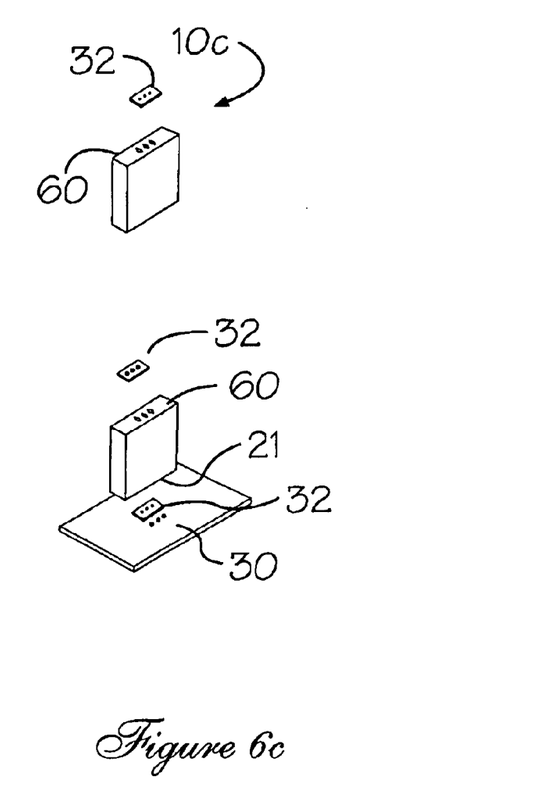
FIG. 6c depicts a perspective, sequential assembly view for a third embodiment of the optical package structure shown in FIG. 2.

Referring to FIG. 6c, another embodiment 10c of an optical package is illustrated. In optical package 10c, active optical device 32 is aligned and bonded to both the top surface 60 and the bottom surface 21 of the coupler housing 12.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An optical package, comprising a substrate having substrate alignment pads disposed thereon, an active optical device having a front side, a back side, means operatively connected to said active optical device for alignment thereof, and a coupler having at least one optical fiber aligned therein, said substrate, said active optical device, and said coupler being optically aligned and bonded together in a predetermined direction to form said optical package, said active optical device being aligned and bonded on its backside to said substrate alignment pads with its at least one active optical element being optically aligned with said substrate alignment pads and said at least one optical fiber of said coupler, and being aligned and bonded to said coupler on its front side, said alignment being accomplished in part by surface tension of a liquid bonding agent disposed between said coupler, said active optical device, and said substrate.

2. The optical package in accordance with claim 1, wherein said substrate alignment pads comprise a through hole with a surrounding annular shaped pad.

3. The optical package in accordance with claim 1, wherein said coupler has a bottom surface, and constructed pads disposed thereon, said constructed pads being bonded to said substrate alignment pads.

4. The optical package in accordance with claim 3, wherein said constructed pads are disposed flush with said coupler bottom surface.

5. A method for manufacturing an optical package comprising a substrate, an active optical element and an optical coupler, the steps comprising:

providing an optical coupler housing comprising at least two alignment pins and a plurality of optical fibers extending in a predetermined direction therefrom, said at least two alignment pins being used to align said optical coupler housing relative to a substrate;

aligning said optical coupler housing to said substrate;

attaching an integrated active optical device to said substrate; and grinding said at least two alignment pins and said plurality of optical fibers in one pass, to produce a flush pin face of said optical coupler housing and a flush constructed pad thereat.

6. The method for manufacturing an optical package in accordance with claim 5, wherein the optical coupler housing has alignment pads for attaching said integrated active optical device, and the steps further comprising directly attaching said integrated active optical device to said alignment pads of said optical coupler housing.

7. The method for manufacturing an optical package in accordance with claim 6, wherein said optical coupler housing and said substrate are attached to said integrated active optical device substantially simultaneously.

8. The method for manufacturing an optical package in accordance with claim 6, wherein said step of aligning said optical coupler housing to said substrate is performed with the aid of said at least two aligning pins.

9. A The method for manufacturing an optical package in accordance with claim 6, the steps further comprising pushing said at least two alignment pins relative to said substrate to create a vertical offset from said optical coupler housing relative to said active optical device.

10. The method for manufacturing an optical package in accordance with claim 6, the steps further comprising introducing a liquid bonding agent between said optical coupler housing, said integrated active optical device and said substrate, the surface tension of said liquid bonding agent facilitating alignment among said substrate, said integrated active optical device, and said optical coupler housing.

11. A The method for manufacturing an optical package in accordance with claim 10, wherein said liquid bonding agent comprises solder in its molten state.

12. The method for manufacturing an optical package in accordance with claim 10, wherein said optical coupler housing has a distal end oppositely disposed from said integrated active optical device, and wherein said steps further comprise attaching a second integrated active optical device to said distal end of said optical coupler housing.

13. The method for manufacturing an optical package in accordance with claim 5, wherein said at least two alignment pins comprise electrically conductive material.

14. The method for manufacturing an optical package in accordance with claim 5, wherein said at least two alignment pins comprise electrically non-conductive material.

15. The method for manufacturing an optical package in accordance with claim 5, wherein said at least two alignment pins comprise thermally conductive material.

16. The method for manufacturing an optical package in accordance with claim 5, wherein said at least two alignment pins comprise thermally non-conductive material.

17. A method for manufacturing an optical package comprising a substrate, an active optical element and an optical coupler, the steps comprising:

providing an optical coupler housing comprising at least two alignment pins and a plurality of optical fibers extending in a predetermined direction therefrom, said at least two alignment pins being used to align said optical coupler housing relative to a substrate;

aligning said optical coupler housing to said substrate;

attaching an integrated active optical device to said substrate; and grinding said at least two alignment pins and said plurality of optical fibers in one pass, to produce protruding constructed alignment pads thereat.

* * * * *